May 13, 1941. H. N. RIDGWAY 2,241,923
AUTOMATIC EMERGENCY TRACTION DEVICE FOR AUTOMOBILES
Filed Feb. 2, 1940 4 Sheets-Sheet 1
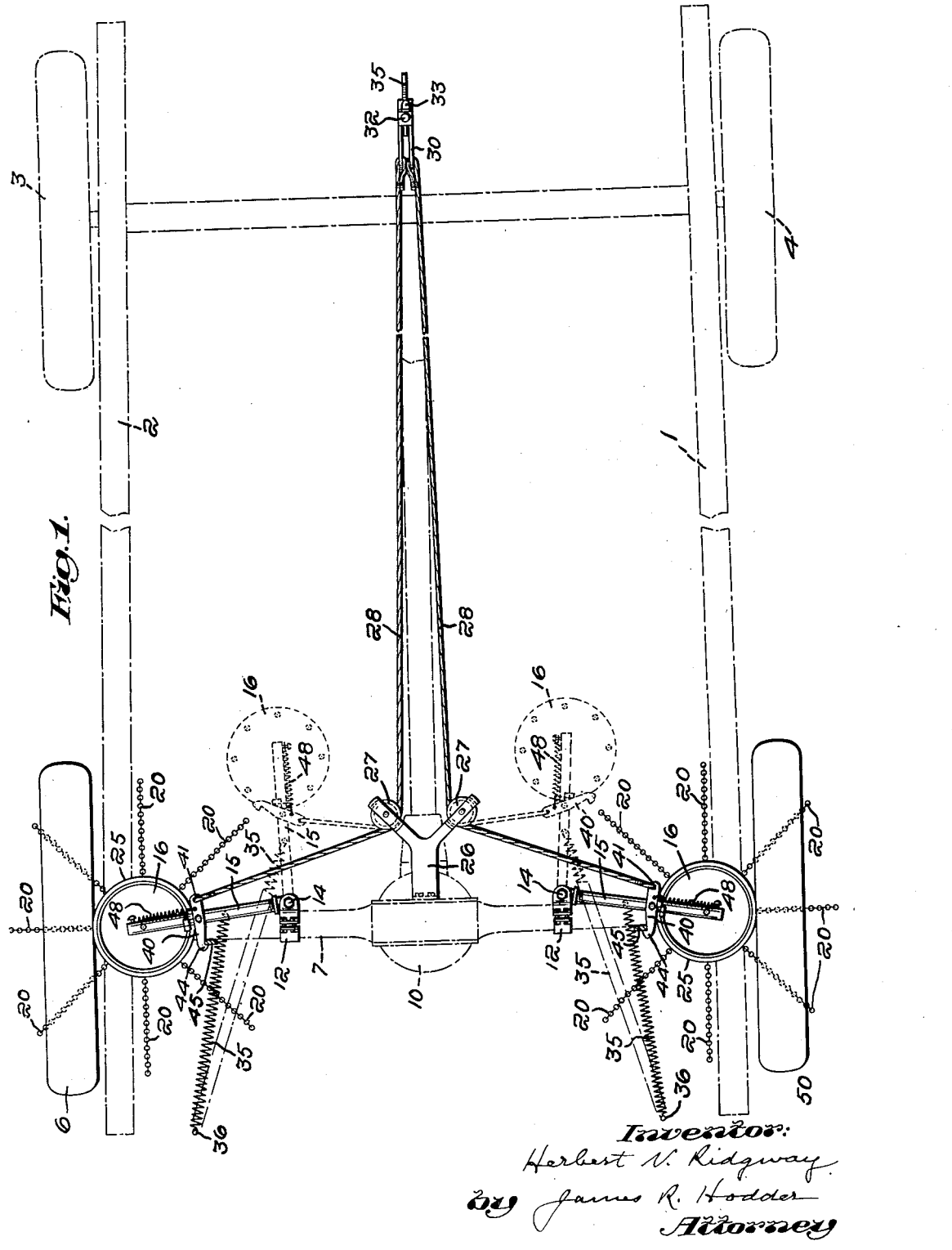

May 13, 1941.  H. N. RIDGWAY  2,241,923
AUTOMATIC EMERGENCY TRACTION DEVICE FOR AUTOMOBILES
Filed Feb. 2, 1940  4 Sheets-Sheet 2
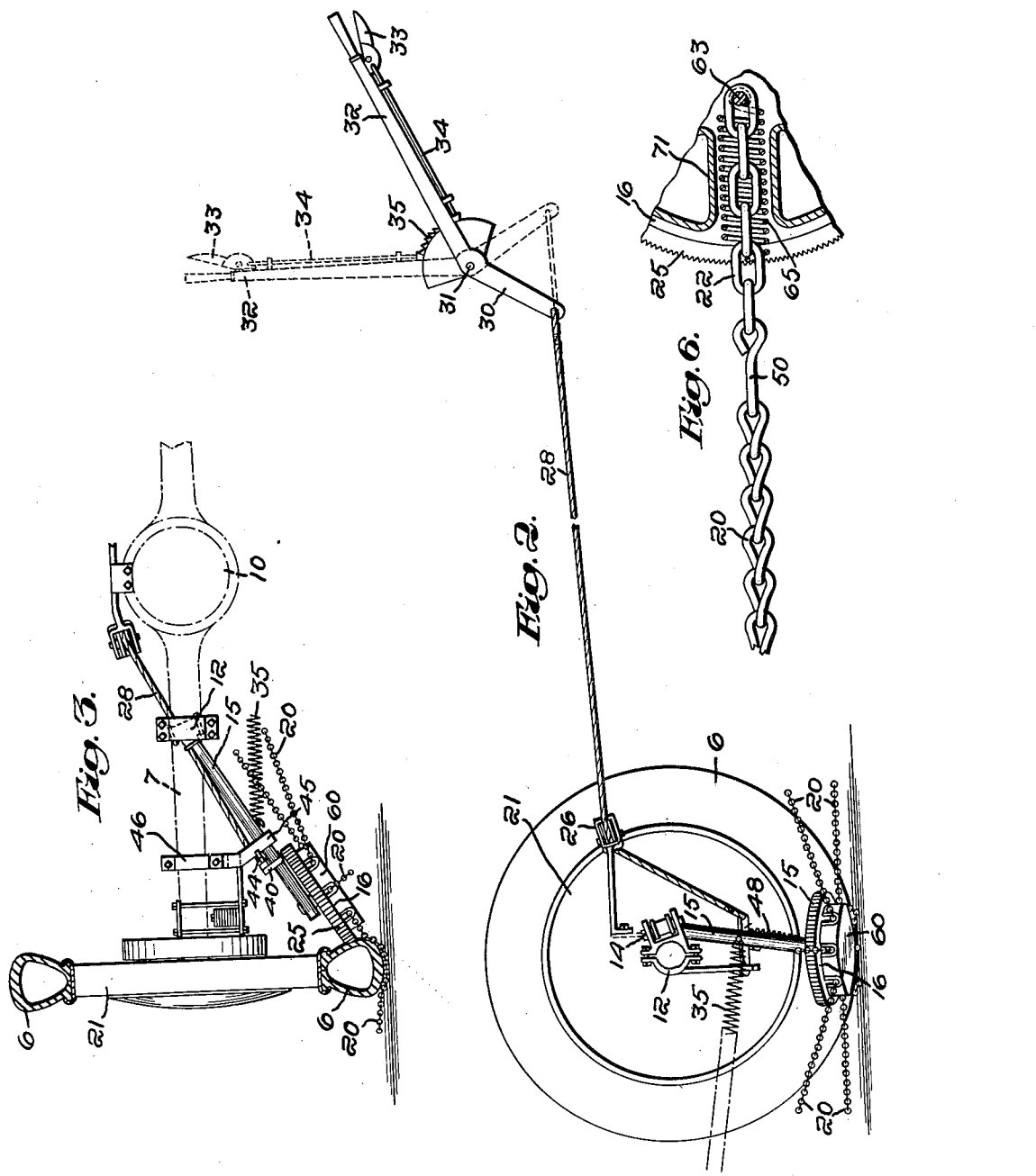
Inventor:
Herbert N. Ridgway
by James R. Hodder
Attorney May 13, 1941.  H. N. RIDGWAY  2,241,923
AUTOMATIC EMERGENCY TRACTION DEVICE FOR AUTOMOBILES
Filed Feb. 2, 1940  4 Sheets-Sheet 3
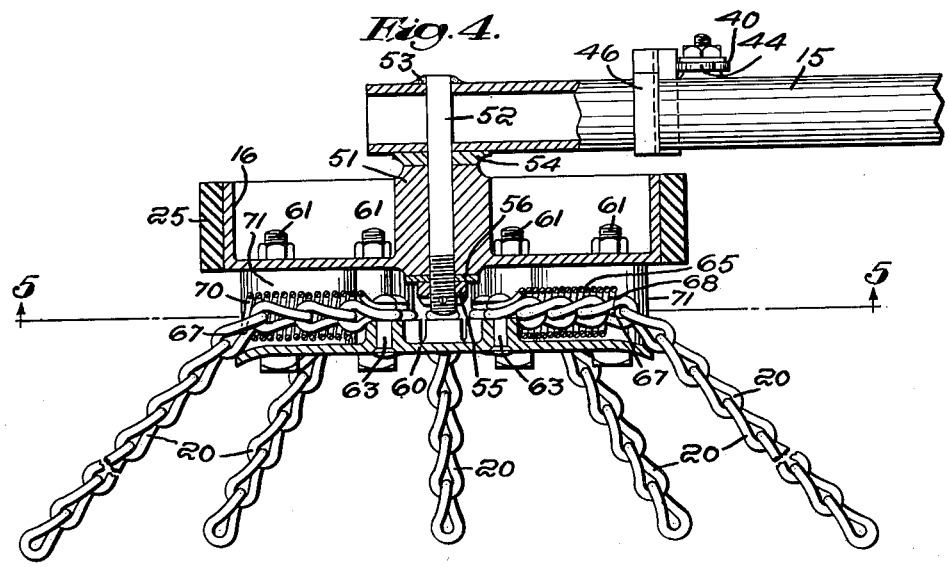
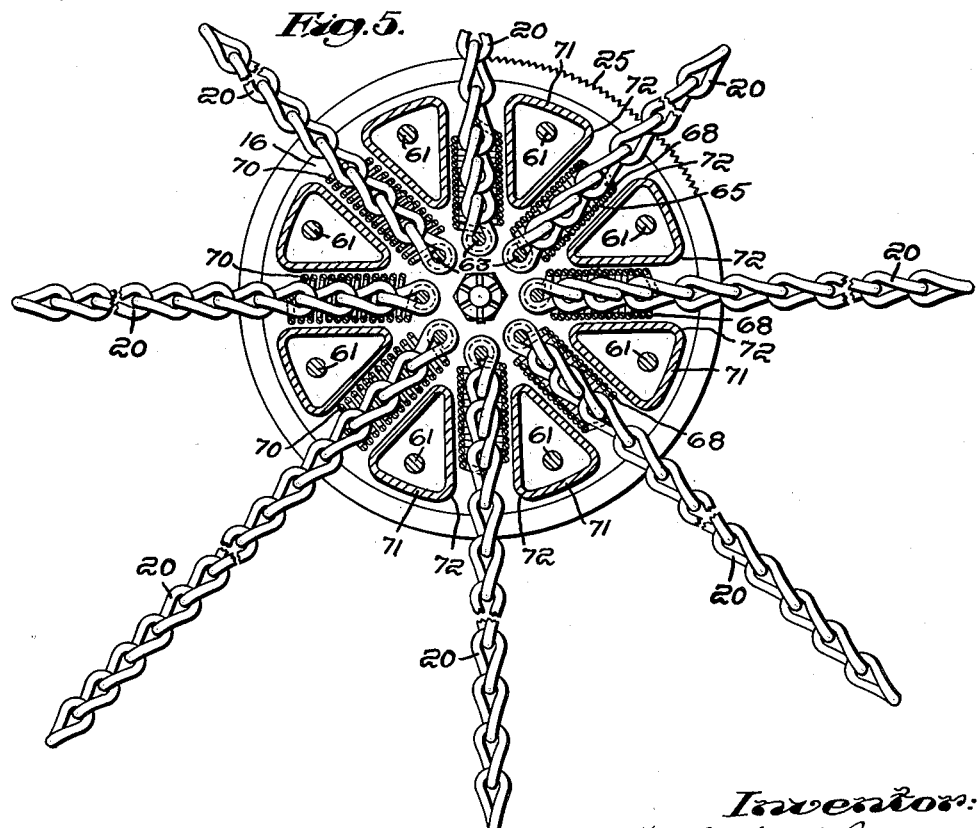

May 13, 1941.　　　H. N. RIDGWAY　　　2,241,923
AUTOMATIC EMERGENCY TRACTION DEVICE FOR AUTOMOBILES
Filed Feb. 2, 1940　　　4 Sheets—Sheet 4
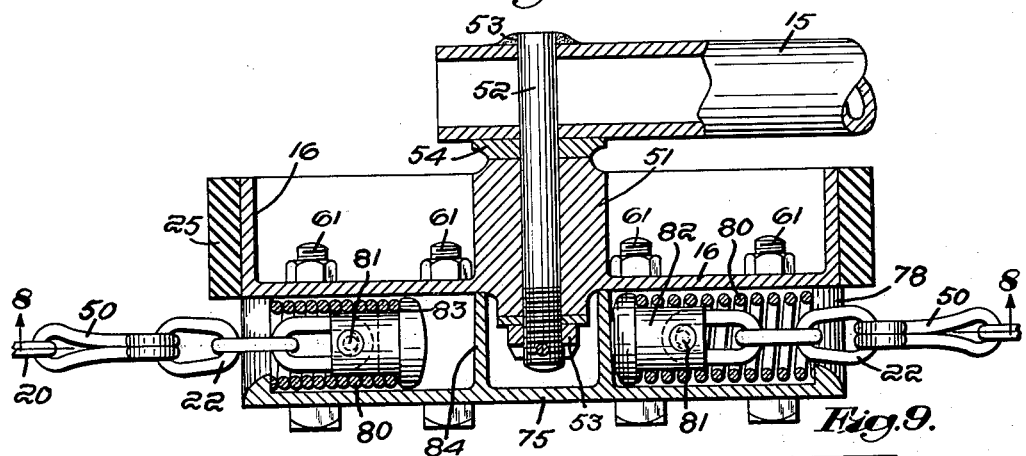
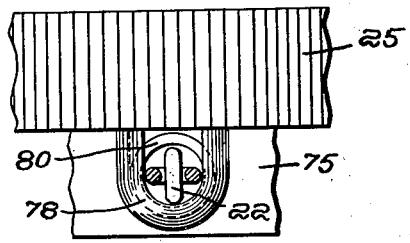
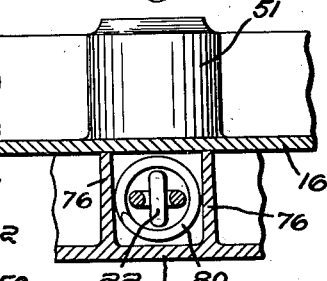
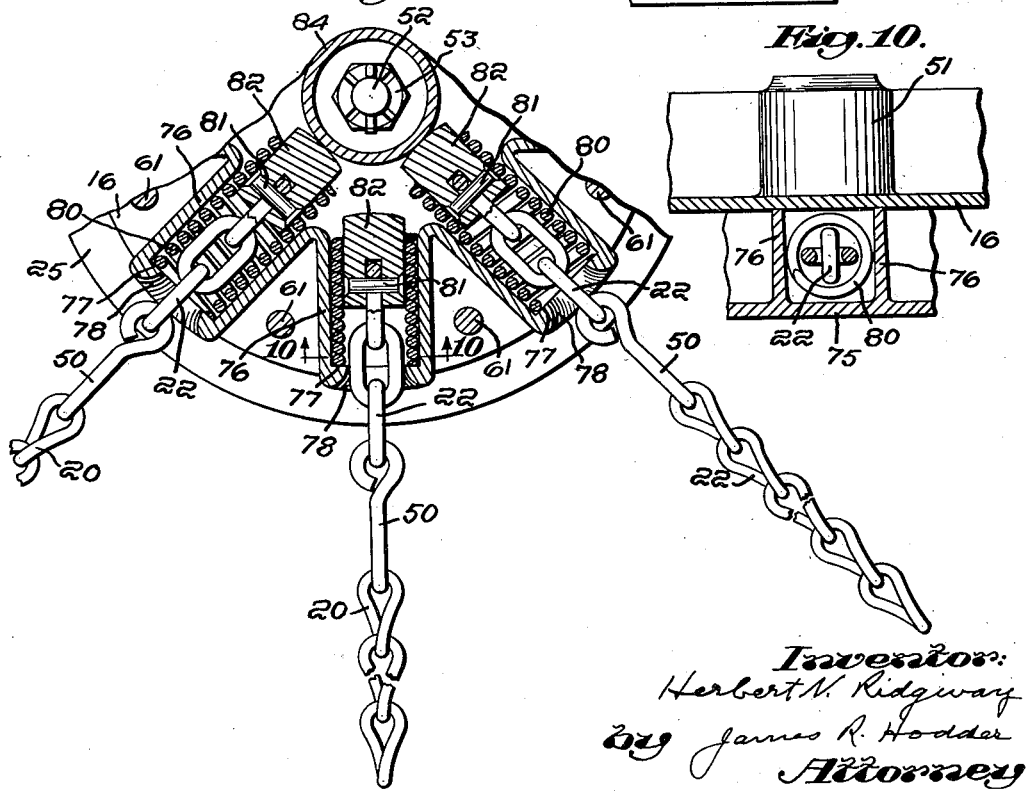
Inventor:
Herbert N. Ridgway
by James R. Hodder
Attorney Patented May 13, 1941

2,241,923

UNITED STATES PATENT OFFICE 2,241,923

AUTOMATIC EMERGENCY TRACTION DEVICE FOR AUTOMOBILES

Herbert N. Ridgway, Winthrop, Mass.

Application February 2, 1940, Serial No. 316,885

7 Claims. (Cl. 188—4)

My present invention is a novel and improved automatic emergency traction device, particularly intended for use with motor vehicles, whether passenger cars, trucks, or other automotive devices.

The object of the present invention is to provide means instantly operable to act automatically to throw or position a plurality of successive traction members under one or more pairs of wheels of a motor vehicle to give added traction to prevent slipping either for continued travel, forwardly, rearwardly, or for stopping.

My present invention contemplates the provision of a device positioned normally out of operative association with the auto wheel with which it can be moved adjacent thereto for operativeness, and, at the will of the driver, will be released and moved automatically adjacent an auto wheel, and thereafter operate thru the continued rotation of the auto wheel in contact therewith to throw automatically a plurality of traction chains or other devices underneath the wheel with which it is adjacently positioned.

Such traction members are preferably operated by centrifugal force due to the rotative action of the auto wheel contacting with the apparatus carrying these anti-friction members, which members are of sufficient length and strength to extend widthwise of the automobile tire and impart a friction tread thereto.

Preferably also I arrange such centrifugally operated friction members, chains, or the like with a yielding, connecting means also carried by the device to which the said friction members are attached, such yielding means permitting each friction device to be engaged by the wheel and to be drawn further during the travel of the vehicle until released by the wheel after it has passed thru the arc of the tread surface.

The traction devices which I employ to be positioned or thrown under the vehicle wheels may be chains or any other traction members, and these members are positioned in advance of the traveling wheel, or pair of wheels, give traction to the wheel between the tread and the roadway or surface over which the vehicle is traveling, and are then released by the passage of the wheel, and said traction devices are again successively and repeatedly thrown into tractive position as long as the driver so desires. Each traction member is free to find its own proper position under the vehicle wheel with which it is associated, and each member is thrown by centrifugal force independently of each other member, and automatically, during the forward travel of the vehicle wheel.

Each tractive member is also independently and yieldingly attached to the carrier, which carrier effects the centrifugal throwing action by contact, preferably yieldingly, with the wheel of the vehicle with which the particular device is associated. Thus the carriers of these traction elements, which are normally in inoperative position under the axle of a pair of wheels of the vehicle, or any other convenient location, are released by the operator and are thereafter moved automatically into operative position, and the traction members individually thrown outwardly and under the wheels. The brakes can then be applied and the car stopped practically instantaneously or the vehicle can be kept moving with the traction members in continuous and repeated operation.

Even if the vehicle is stationary, the movement of the rear wheels will actuate the carriers and, hence, centrifugal force thru the traction members under the wheels to start the vehicle. To release the traction members in order to return the carriers to inoperative position, the vehicle is stopped and a slight backing movement rolls the wheels off of any of the tractive members which may be under the tread of the wheels when the vehicle is stopped, and thereupon the carriers are raised to inoperative position and the car may then proceed.

Or if it is desired to continue forward movement of the vehicle, as when the car is temporarily stalled or stopped in snow, ice, or mud, these traction members are brought into use as soon as needed; whereupon the car is stopped, back, and the devices and carriers raised to inoperative position until again needed.

Various modifications will readily occur to those skilled in the art, and I have shown in the attached drawings for illustrative purposes a preferred embodiment of my present invention.

Fig. 1 is a diagrammatic view illustrating in plan my invention as applied to the rear wheels of a vehicle;

Fig. 2 is a fragmentary side view;

Fig. 3 is a fragmentary front view showing the vehicle wheel in cross-section;

Fig. 4 is an enlarged cross-sectional view illustrating one form of yielding attachment of the traction element to the carrier;

Fig. 5 is a view on the line 5—5 of Fig. 4;

Fig. 6 is an enlarged fragmentary view illustrating one of the traction elements and a yielding connection with the carrier;

Fig. 7 is a cross-sectional view also on an enlarged scale illustrating a modified form of yielding attachment of the traction elements to the carrier;

Fig. 8 is a partial cross-sectional view on the line 8—8 of Fig. 7;

Fig. 9 is a fragmentary view showing the bevelled bearing for the traction chain, and Fig. 10 is a fragmentary cross-sectional view on the line 10—10 of Fig. 8.

Referring to the drawings, I have illustrated in Fig. 1 in diagrammatic form an outline of a vehicle chassis shown in dotted lines at 1 and 2, together with a pair of front tire wheels 3 and 4 secured to the chassis frame in the usual manner, and having a rear axle housing 7 and a differential 10, illustrated in dotted lines.

My friction elements are secured to the rear axle housing 7, or in any other suitable position of the frame of the vehicle chassis, and adjacent the opposite pair of wheels, preferably the driving wheels.

As herein shown, I secure a pair of clamps 12—12 to the rear axle housing 7, to which clamps 12—12 are pivotally attached at 14—14 rods 15—15, each of said rods having a carrier 16 secured at the opposite end from the pivot 14. These carriers 16 are adapted to be swung into inoperative position, as shown in dotted lines at Fig. 1, and to be released at the will of the driver; whereupon they will be moved into operative position adjacent the lower tread surface of the opposite pair of wheel tires 5 and 6. Each carrier 16 is provided with a plurality of traction members 20, which may be of any suitable size, type, or material.

I have herein illustrated at 20 the usual type of automobile link chain, and which chain is so secured to the carrier 16 that it has an independent yielding action. Also, when the carrier 16 is moved from the inoperative position, as shown in the dotted lines Fig. 1, to the full line positions of Figs. 1, 2, and 3, I provide means which will rotate each carrier 16, thus throwing out the chains 20 by centrifugal force, the carrier being so positioned that each chain 20 will be successively thrown under the forward part of the tires 5 and 6, respectively, thus constituting traction members under each wheel tire, the wheels being of any desired construction, indicated in conventional form at 21.

Any suitable means may be employed to effect the rotation of the carrier 16 to produce this rotating and, hence, centrifugal effect on the traction members 20. Preferably I so arrange the rods to be positioned downwardly and angularly from their respective pivots 14, whereby the periphery of each wheel 16 will be brought in contact with the bottom portion of the tire adjacent which the member 16 is positioned. With the wheels in motion, this contact will effect a rotating action on each carrier 16 and, hence, a centrifugal action on the traction elements 20.

In order to facilitate such frictional driving contact between each carrier 16 and its adjacent tire when moved into operative position, I secure on the rim of the carrier 16 a frictional contact surface, as indicated at 25, which may be of rubber, corrugated, or otherwise to insure the rotation of the carrier 16 when in contact with the moving vehicle tires with which it is in contact. Thus, I provide means which will automatically effect the rotation of the carrier 16 and, hence, the outward movement or throwing by centrifugal force of the traction members 20.

Any desired method of moving the carrier and its attached traction members from operative to inoperative position may be employed, but as herein shown I have devised a simple means which will now be explained.

Attached to the bracket 26 are a pair of pulleys 27—27 around which are led wires or ropes 28—28, having the forward or front end of said ropes attached to one end of a lever 30, which lever is pivoted at the front of the machine, as shown at 31, and has a handle 32 and latch 33 operating a rod 34, with a tooth at the lower end to engage the rack 35, see Fig. 3, thus positioned within convenient reach of the operator and the opposite end of each rope or wire 28 attached to each of the rods 15 so as to swing the carriers 16 into inoperative position upon the driver pulling up the handle 32 of the lever 30 into the dotted line position, as shown in Fig. 2.

Upon release of this hand lever, the carriers 16 are each, preferably, moved into operative position by springs 35, thus automatically and yieldingly effecting the contact between the rim of each carrier 16 and the tire adjacent to which said carrier is moved. These springs 35 may be attached at one end to an extension or part of the frame, as indicated at 36 in dotted lines, Fig. 1, and with the opposite end attached to a convenient position on the rods 15.

Preferably I utilize a latch 40, also pivotally mounted on each lever 15 to one end of each latch as indicated at 41 is spliced or otherwise secured the end of the rope or wire 28, the opposite end of the latch 40 being in the form of a hook 44 adapted to catch over an arm 45 of a bracket 46 clamped about the housing 7.

Thus upon release of the hand lever 32, the springs 35 will move each of the carriers 16 yieldingly and automatically into operative position, and the latch 40 carried by each will engage and lock upon the cross-bars 46 in position therefor, a spring 48 attached to each latch 40 serving to effect this locking action. Upon movement of the handle 32 to retract the carriers to inoperative position, the first action of said movement would be to unlock the hook 44 of the arm 45 and thereafter move the carriers to inoperative position. The arm 45 also constitutes a stop or limit for the movement of the carrier 16 caused by the spring 35, it being intended that the friction surface 25 of the carrier 16 will contact with the vehicle tire prior to reaching the arm 45, so that there will always be a frictional yielding engagement between the carrier and the vehicle tire.

As a traction member is thrown under a vehicle wheel and is engaged between the vehicle wheel and the ground or surface on which the wheel is resting, it will be caught and held therein and, thereafter, as the vehicle moves forwardly, or as the traction member 20 is moved rearwardly in case the wheel is slipping, as on ice or the like, there will be a tendency to draw, lengthen, or pull the traction member 20 relatively with its carrier. To compensate for this action, it is important to have a yielding connection between the carrier and each of the traction elements. Any suitable yielding connection may be employed for this purpose, and I have illustrated two modified forms of construction to carry out the same.

It is also desirable to have the wearing portion traction elements capable of ready renewal, and for this purpose I may interpose a master link 50, see Fig. 6, which can be readily clamped in or around the worn or broken part 20 to the inner links of the chain, as indicated in Fig. 6 and designated at 22.

Referring to Figs. 4 and 5, a detailed construction of a yielding means for connecting the carrier 16 with each of the traction elements 20, and also a preferred method of mounting the carriers 16 so as to be readily retained on the arm 15 is shown. As illustrated, the carrier 16 is constructed with a hub 51 thru which a pivot shaft 52 is fitted, constituting an axle on which the carrier 16 may rotate, said shaft being riveted or otherwise secured thru the end portion of the rod 15, as shown at 53, with a washer 54 between the rod 15 and the hub 51, together with a lock nut 55 on the opposite end of the shaft 52 and a washer 56 bearing between the lock nut and the hub 51. Any equivalent construction can, of course, be employed.

I prefer to attach the several traction elements 20 and their yielding connections to the carrier 16 by providing a cage 60, securing the same by a plurality of bolts 61 to the carrier 16, as shown in Figs. 4 and 5. This cage has a series of pins near the center, as designated at 63, to which pins the innermost links of the traction members 20 are respectively secured.

I also provide around each chain a coiled spring 65 with the inner end of each spring 66 also secured around the respective pin 63 holding the traction member, and with the opposite end of the spring 65 engaging one of the links of the traction members 20, as shown at 65. Thus the normal tendency of the spring 65, by engagement with its outer end in the link of the chain, is to hold the inner links, see Figs. 4 and 5 at the right, as indicated at 68 nested or telescoped together. Thereafter, when the pull is exerted on the outer part of the traction member 20, being drawn under the vehicle wheel as the same rotates, whether or not the vehicle is also moving forward, the member 20 may thus be drawn or expanded outwardly, taking up the slack afforded by the nesting of the link when in the position shown in 68, to an expended position, i. e. the limit of the length of the links, as shown at the positions indicated at 70—70 in Figs. 4 and 5.

In order to constitute a guiding means for the springs 65 and the chains passing thru them, I prefer to form a series of partitions 71 as a part of the cage 60, as best shown in Fig. 5, forming each partition with a rounded edge 72 over which the traction members 20 may be drawn when pulled sideways to prevent undue wear thereof. These partitions may be conveniently positioned in triangular form substantially as illustrated and encircle the connecting bolts 61, which holds the cage 60 and carrier 16 in assembled position.

In order to renew a spring or chain, it is only necessary to back off the nuts holding the bolts 61 and the entire cage is open, as illustrated in Fig. 5, to facilitate removal, replacement, or repair of the springs and chains, as will be readily appreciated.

A modified form of cage and link-connecting yielding means is illustrated in Figs. 7, 8, 9, and 10. In this form, the carrier 16 may have fitted to it a cage 75 by bolts 61, this cage having a series of flanged partitions, having V-shaped side walls 76—76, with an inturned flange 77 at the bottom portion, and a rounded opening 78 encircling said inturned flanges thru which opening the chain 20 may pass, and upon which inturned flange the bottom portion of the coiled spring 80 rests. The endmost link of the chain or the inner portion 22 where the master link 50 is employed has a pin 81 passing therethru and holds the chain to a sliding plug 82. This plug has an encircling flange 83 against which the upper convolution of the spring 80 bears, and the top of the plug, when the chain is not under a pulling tension, contacts with an inner partition 84. Thus, as shown at the right, Fig. 7, the expansible coiled spring 80 holds the chain yieldingly within the cage 75 to the limit permitted by the contact of the top of the plug 82 against the inner partition 84. The tension of each spring 80 is preferably sufficient to thus hold the chain in innermost position against the ordinary centrifugal force developed by rotation of the carrier and its attached cage, but upon engagement of the member 20 under the vehicle wheel the chain is thereupon allowed to yield and move outwardly, compressing the spring 80 as shown at the right of Fig. 7 and in the middle position of Fig. 8, thus allowing for the yield necessary and desired for this purpose.

Various modifications will readily occur to those skilled in the art. I may arrange the rotating carrier 16 to be moved vertically, if desired, instead of swinging same as illustrated in Fig. 1; and I may of course employ other means for moving the carrier from operative to inoperative position than by means of the hand lever or wires and cords illustrated in Figs. 1 and 2. Also, I may employ other means for rotation of the carrier, or any efficient method of throwing out the traction members 20 to engage under the bottom of the vehicle wheels and the ground or surface on which the same are moving.

The operation of these traction devices adjacent the pairs of wheels will insure the traction of both wheels of the pair, while maintaining the independent traction action of each wheel and each traction member 20. When each carrier 16 is moved to inoperative position or free from rotative action, the several members 20 are, of course, drawn, housed, or nested within the cage holding the same as far as possible, and the members 20 simply hang freely downwardly, but upon moving each carrier into operative position, full traction is immediately imparted for both wheels of the pair, either for moving ahead or for applying the brakes and stopping. The traction members can be maintained in operative position as long as desired and, thereupon, to move them to inoperative position, the driver stops the vehicle, backs up slightly to free the traction members under the wheels so that said members and the carriers can be readily shifted, moved, or swung to inoperative position as already explained, thus providing an instantly operable traction apparatus, preferably with means for automatically positioning the same in the operative position upon release and providing traction devices thrown under the vehicle wheels, preferably by centrifugal force, which are instantly and automatically so positioned.

It will be appreciated that the traction members, while each independently movable when under the wheel of the vehicle, allowing for an automatic self-seating or positioning action with freedom of movement to a considerable extent, yet are nevertheless held by the carrier at one end, which carrier is closely adjacent and, preferably, in contact with the bottom rim of the tire on the vehicle wheel. Thus, the cooperation between the moving tire, the rotating carrier, and each traction member automatically insures the tractive effect and the holding of a chain or traction member yieldingly while still permitting freedom of settling or gripping action under the wheel.

This triple cooperation is effective either while the vehicle is moving forwardly or backwardly, or when the vehicle is stationary and the tire itself is in rotation, as on ice, in mud, or the like, until the tractive effect of my device becomes operative.

It will also be appreciated that the latch 40 will hold the carrier 16 in frictional rotative engagement with the wheel during the backing or rearward movement, as otherwise the carrier might be swung out of operative engagement with the vehicle tire. Therefore, with the latch thus locking the carrier into its cooperative action with the vehicle wheel, or with each pair of wheels equipped with my apparatus, the car can be moved ahead or rearwardly as desired. To release the tractions, the simultaneous movement of the handle first releasing the latch and then drawing the carriers upwardly during slow backing of the vehicle tire accomplishes a movement from operative to inoperative position.

I claim:

1. Traction apparatus of the kind described, comprising means to position a series of traction members under the wheels of an automobile, including a rotatable carrier mounted on a movable support adapted to move said carrier adjacent one wheel of a pair of vehicle wheels, with the rim of the rotatable carrier in impinging contact with the side wall of the standard tire of said wheel, non-slipping means on the rim of the carrier to frictionally indent the tire and rotate said carrier in fixed relation with the rotation of said tire wheel, said rotatable carrier having a plurality of flexible traction members yieldingly connected to the carrier and operated automatically to throw successive traction members under the tire by the rotative action of said carrier, in combination with automatic means to lock said carrier and tire in driving engagement.

2. Traction apparatus of the kind described, comprising means to position a series of traction members under the wheels of an automobile, including a rotatable carrier mounted on a movable support adapted to move said carrier adjacent one wheel of a pair of vehicle wheels, with the rim of the rotatable carrier in impinging contact with the side wall of the tire of said wheel, non-slipping means on the rim of the carrier to frictionally indent the tire and rotate said carrier in fixed relation with the rotation of said tire wheel, said rotatable carrier having a plurality of flexible traction members yieldingly connected to the carrier and operated automatically to throw successive traction members under the tire by the rotative action of said carrier, in combination with means to automatically latch the carrier in said impinging contact when the carrier is moved to operative position, and to automatically unlatch said carrier by means operable to remove the carrier from operative contact.

3. Traction apparatus of the kind described, comprising a pair of rotatable carriers, supports on which said carriers may rotate, means adapted to move said supports to cause said carriers to engage the side walls of a vehicle tire adjacent to which the support is mounted, and means to remove the support and carrier from said engagement, the said support and carrier being constructed and arranged to cause contact between the rim of the carrier and the side wall of which said tire is mounted to cause a constantly of the tire in advance of the axis of the wheel on increasing frictional action during the contact of carrier and tire, a stop to limit the relative movement of said carrier support and the tire, said carrier having a plurality of flexible frictional members yieldingly secured thereto and adapted to be thrown successively under the vehicle wheel during rotation thereof, in combination with means automatically actuated to lock and unlock the carrier in cooperation with said stop.

4. Traction apparatus of the kind described, comprising a pair of rotatable carriers, each having a plurality of traction devices yieldingly secured thereto and adapted to be thrown under the tire by centrifugal force, said carrier being mounted on a pivotal support in advance of the axle carrying the vehicle wheels, the length of said support and periphery of the rotatable carrier being greater than the distance from said pivotal support to the sides of the tire adjacent which said support is mounted, and means to move said support and carrier into engagement with the tire, whereby the rim of said carrier will indent the side walls of the tire and insure frictional driving contact of said carrier, in combination with automatic locking means operable during said driving contact and automatically unlocking upon movement of said carrier out of driving contact.

5. Traction apparatus of the kind described, comprising a pair of rotatable carriers, each having a plurality of traction devices yieldingly secured thereto and adapted to be thrown under the tire by centrifugal force, said carrier being mounted on a pivotal support in advance of the axle carrying the vehicle wheels, the length of said support and periphery of the rotatable carrier being greater than the distance from said pivotal support to the sides of the tire adjacent which said support is mounted, and means to move said support and carrier into engagement with the tire, whereby the rim of said carrier will indent the side walls of the tire and insure frictional driving contact on said support, including a stop for said support when swung into tire-engaging position, said stop being rearwardly of the pivot of said support to produce a self-locking toggle action.

6. Traction apparatus of the kind described, comprising a pair of rotatable carriers, each having a plurality of traction devices yieldingly secured thereto and adapted to be thrown under the tire by centrifugal force, said carrier being mounted on a pivotal support in advance of the axle carrying the vehicle wheels, the length of said support and periphery of the rotatable carrier being greater than the distance from said pivotal support to the sides of the tire adjacent which said support is mounted, and means to move said support and carrier into engagement with the tire, whereby the rim of said carrier will indent the side walls of the tire and insure frictional driving contact on said support, including a stop for said support when swung into tire-engaging position, said stop being rearwardly of the pivot of said support to produce a self-locking toggle action, which toggle lock is only breakable by reversing the driving direction of the vehicle wheel.

7. Traction apparatus of the kind described, comprising a pair of rotatable carriers, each having a plurality of traction devices yieldingly secured thereto and adapted to be thrown under the tire by centrifugal force, said carrier being mounted on a pivotal support on the axle carrying the vehicle wheels, the length of said support and periphery of the rotatable carrier being greater than the distance from said pivotal support to the sides of the tire adjacent which said support is mounted, and means to move said support and carrier into engagement with the tire, whereby the rim of said carrier will indent the side walls of the tire and insure frictional driving contact on said support, including a stop for said support when swung into tire-engaging position, said stop being rearwardly of the pivot of said support to produce a self-locking toggle action.

HERBERT N. RIDGWAY.